United States Patent Office 3,321,436
Patented May 23, 1967

3,321,436
STABILIZED LINEAR POLYAMIDES WITH SCHIFF'S BASE
Walter Stilz, Horst Pommer, Hans Biczysko, and Heinz Fessmann, Ludwigshafen (Rhine), Germany, assignors to Badische Anilin- & Soda-Fabrik Aktiengesellschaft, Ludwigshafen (Rhine), Germany
No Drawing. Filed July 11, 1962, Ser. No. 209,261
Claims priority, application Germany, July 14, 1961, B 63,266
8 Claims. (Cl. 260—45.8)

This invention relates to stabilized polyamides with carbonamide groups in the polymer chain, and to a process for their production.

Linear polyamides with constantly recurring carbonamide groups in the chain molecules, such as nylon, polyurethanes and polyureas, have acquired great industrial importance. As is well known, such linear polyamides may lose their good mechanical properties under the influence of light, oxygen or elevated temperatures. These adverse effects can be reduced by the addition of stabilizers. As stabilizers for polyamides there are known phenols, amines and urea derivatives, for example N-aryl substituted secondary aromatic polyamines, such as N,N'-diphenyl-1,4-phenylenediamine, N,N'-diphenyl-2,7-naphthylenediamine and N-phenyl - N' - benzylphenylenediamine. Stabilizers of this kind have the disadvantage that they can be washed out from the polyamides with water and also that they tend to migrate, which often considerably restricts their use.

We have found that mixtures of 99.99 to 95%, preferably 99.9 to 99%, by weight of a linear polyamide with constantly recurring carbonamide groups in the chain and 0.01 to 5%, preferably 0.1 to 1%, by weight of a Schiff's base having the general formula

where $R_1$ denotes a bivalent aliphatic radical with 2 to 12 carbon atoms, a bivalent aromatic radical, for example, ortho-, meta- or para-phenylene which may contain from 1 to 2 alkyl radicals with 1 to 4 carbon atoms, or naphthylene; A has the meaning

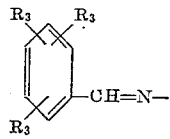

$R_3$ denoting hydrogen, methyl, ethyl, propyl, isobutyl, hydroxy, methoxy, ethoxy, propoxy, butoxy or

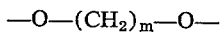

and B has the same meaning as A or is hydrogen, $COOR_4$, $R_4$ being an alkyl with 1 to 8 carbon atoms, $NHR_5$ $R_5$ being alkyl with 1 to 4 carbon atoms, or aryl with 6 to 12 carbon atoms, $NR_6$, $R_6$ being alkyl with 1 to 4 carbon atoms, alkoxy with 1 to 4 carbon atoms or aryloxy with 6 to 12 carbon atoms are excellently stabilized against the action of light, heat and oxygen.

Suitable compounds are, for example, N-3,4-methylenedioxybenzal-p-aminodiphenylamine, N,N' - bis-3',4'-methylenedioxybenzal-1,4-phenylenediamine, N-4-oxy-3-methoxybenzal-p-aminodiphenylamine, N-2-oxybenzal-p-aminodiphenylamine, N - 3,4 - methylenedioxybenzal-p-aminobenzoic acid ethyl ester, 3,4-methylenedioxybenzal-β-naphthylamine, 3-methoxy - 4 - oxybenzal-β-naphthylamine, N,N'-bis-3,4-methylenedioxybenzal - ethylenediamine, N,N'-bis-3,4-methylenedioxybenzal - hexamethylenediamine, N-4-oxy-3,5 - ditert.-butyl-benzal-p-aminodiphenylamine, N-benzal - β - naphthylamine, and N-3,4-methylenedioxybenzal-aniline.

The term "linear polyamides with constantly recurring carbonamide groups in the chain" as used herein includes such polyamides as nylon, polyurethanes and polyureas.

Polyamides which can be stabilized according to this invention include those prepared from diamines and dicarboxylic acids, for example from hexamethylenediamine and adipic acid or m-xylylenediamine and adipic acid, as well as from lactams containing more than three ring carbon atoms, such as pyrrolidone, piperidone, caprolactam, caprylic lactam, dodecylic lactam or undecylic lactam. Polyamides which are especially suitable for stabilization according to the invention are, for example, those having a relative viscosity of 2.0 to 4.5, measured at a concentration of 1 gram of polyamide in 100 ml. of 96% by weight sulfuric acid.

Polyurethanes which can be stabilized according to this invention include those prepared from 1,6-hexane diisocyanate and 1,4-butylenediol.

As a rule, the bis-styrylbenzenes or stilbenes are added to the polyamides in amounts of 0.01 to 5%, preferably 0.1 to 2%, by weight. They may either be added to the monomers prior to condensation or polyaddition, or may be mixed, for example in a screw extruder or kneader, with the finished polyamide, if desired together with further additives, such as fillers, pigments, dulling agents or dyes.

The compounds used according to the invention are added to the polyamides in amounts of 0.01 to 5%, preferably 0.1 to 1%, by weight.

The stabilized polyamide mixtures prepared according to this invention are characterized above all by improved heat resistance, and hence are especially suitable for the production of fabrics, constructional parts and coatings which at high temperatures are subjected to high mechanical stresses. Thus, for example, polycaprolactam stabilized according to this invention is well suited to the production of tire cord. The stabilizers added to the polyamide do not migrate and are not washed out by water.

The invention will be further illustrated by, but is not limited to, the following examples. The parts specified in the examples are by weight.

Example 1

(I) 958 parts caprolactam and 40 parts hexamethylenediamine adipate are mixed with 2 parts 3,4-methylenedioxybenzal-p-aminodiphenylamine and polymerized for 15 hours at 275° C. in an inert gas atmosphere. The product is spun by conventional melt-spinning methods into 58/10 den. filament with a relative viscosity of 2.50 measured in 96% sulfuric acid, drawn and then freed from low molecular weight portions by boiling in water. The filament obtained has a strength of 4.8 g./den.

(II) 954 parts caprolactam and 40 parts hexamethylenediamine adipate are polymerized as described under I in an inert gas atmosphere with an addition of 6 parts 3,4-methylenedioxybenzal-p-aminodiphenylamine and the product is spun, drawn, and washed. The spun filament has a relative viscosity of 2.45, 62/10 den. and a strength of 4.6 g./den.

(III) For comparison, 960 parts caprolactam and 40 parts hexamethylenediamine adipate are polymerized as described under I without addition of a heat stabilizer and the product is spun, drawn and washed. The spun filament has a relative viscosity of 2.52, 61/10 den. and a strength of 4.5 g./den.

In order to test their stability to heat, samples of filaments I, II and III are exposed to a temperature of 190° C. in a drying cabinet in air. After the treatment, the residual strength of the filaments treated is determined. By "residual strength" we understand the ratio (in percent) of the strength of the filaments measured after the treatment to the strength determined before the heat treatment. The following table gives for filaments I, II and III the residual strengths after treatment for one and three hours at 190° C. in air.

| Filament according to— | Residual strength (percent) after heating at 190° C. for— | |
|---|---|---|
| | 1 hour | 3 hours |
| I | 91 | 72 |
| II | 95 | 86 |
| III | 42 | 38 |

*Example 2*

Caprolactam is polymerized in conventional manner with the addition of X% of stabilizer y, the polymer is spun into filament and the filament drawn. The residual strength of the filaments is determined in each case after exposure to 190° C. for 1 and 3 hours in air with prevention of shrinkage. The values obtained from filaments containing the stabilizers specified are given in the following table which also gives the values for untreated filament.

The spun filaments are incorporated in white rubber. After 10 weeks' exposure to artificial light the surface of the white rubber shows no discoloration. The same treatment is applied to fibers stabilized with 0.5% N,N'-diphenyl-1,4-phenylenediamine. After only 6 days the rubber surface shows strong brownish discoloration. Stabilized cord of this kind is unsuitable for such applications as white-wall tires.

| X percent | Stabilizer y | 1/10 den. | Residual strength (percent) after heating at 190° C. for— | |
|---|---|---|---|---|
| | | | 1 hour | 3 hours |
| 0 | None | 60 | 44 | 36 |
| 0.5 | N,N'-bis-3,4-methylenedioxybenzal ethylenediamine. | 55 | 89 | 80 |
| 0.5 | N,N'-bis-3,4-methylenedioxybenzal-p-phenylenediamine. | 90 | 87 | 79 |
| 1.0 | ___do___ | 86 | 99 | 88 |
| 0.5 | N-benzal-p-aminodiphenylamine. | 88 | 89 | 81 |
| 0.6 | N-4-oxy-3,5-ditert.-butyl-benzal-p-aminodiphenylamine. | 50 | 91 | 83 |
| 0.5 | N-4-oxy-3-methoxy-benzal-p-aminodiphenylamine. | 65 | 95 | 88 |
| 1.0 | ___do___ | 90 | 100 | 99 |
| 0.5 | N-benzal-β-naphthylamine. | 80 | 86 | 71 |
| 0.5 | N-4-oxy-3-methoxy-benzal-β-naphthylamine. | 71 | 90 | 80 |
| 1.0 | ___do___ | 68 | 96 | 87 |
| 0.5 | N-3,4-methylenedioxybenzal-β-napthylamine. | 68 | 95 | 82 |
| 1.0 | ___do___ | 70 | 98 | 84 |
| 0.5 | N,N'-bis-3,4-methylenedioxybenzal-hexamethylenediamine. | 67 | 94 | 82 |
| 1.0 | ___do___ | 69 | 97 | 87 |
| 0.5 | N-3,4-methylenedioxybenzal-p-ethyl-aminobenzoate. | 80 | 87 | 79 |
| 1.0 | ___do___ | 83 | 100 | 91 |
| 1.0 | N-3,4-methylenedioxybenzal-aniline. | 65 | 95 | 79 |

We claim:

1. A composition of matter comprising a mixture of 99.99 to 95% by weight of a linear fiber-forming polyamide and 0.01 to 5% by weight of a compound having the general formula A—R—B where $R_1$ is a bivalent member selected from the group consisting of aliphatic radicals with 2 to 12 carbon atoms and aromatic radicals; A has the meaning

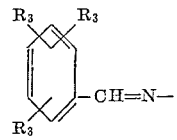

$R_3$ being a member selected from the group consisting of hydrogen, methyl, ethyl, propyl, isobutyl, methoxy, ethoxy, propoxy, butoxy, and —O—(CH$_2$)$_m$—O—, where $m$ is one of the integers 1 and 2 and the oxygen is attached directly in ortho-position to the benzene nucleus, B is a member selected from the group consisting of hydrogen, A, —COOR$_4$, where $R_4$ is alkyl with 1 to 8 carbon atoms, —NHR$_5$, where $R_5$ is a member selected from the group consisting of alkyl with 1 to 4 carbon atoms and aryl, >NR$_6$, where $R_6$ is alkyl with 1 to 4 carbon atoms, alkoxy with 1 to 4 carbon atoms, and aryloxy with 6 to 12 carbon atoms.

2. A composition of matter comprising a mixture of 99.99 to 95% by weight of a linear polyamide and 0.01 to 5% by weight of N-3,4-methylenedioxybenzal-p-aminodiphenylamine.

3. A composition of matter comprising a mixture of 99.99 to 95% by weight of a linear polyamide and 0.01 to 5% by weight of N,N'-bis-3',4'-methylenedioxybenzal-1,4-phenylenediamine.

4. A composition of matter comprising a mixture of 99.99 to 95% by weight of a linear polyamide and 0.01 to 5% by weight of N-3,4-methylenedioxybenzal-p-aminobenzoic acid ethyl ester.

5. A composition of matter comprising a mixture of 99.99 to 95% by weight of a linear polyamide and 0.01 to 5% by weight of 3,4-methylenedioxybenzal-β-naphthylamine.

6. A composition of matter comprising a mixture of 99.99 to 95% by weight of a linear polyamide and 0.01 to 5% by weight of N,N'-bis-3,4-methylenedioxybenzal-ethylenediamine.

7. A composition of matter comprising a mixture of 99.99 to 95% by weight of a linear polyamide and 0.01 to 5% by weight of N,N'-bis-3,4-methylenedioxybenzal-hexamethylenediamine.

8. A composition of matter comprising a mixture of 99.99 to 95% by weight of a linear polyamide and 0.01 to 5% by weight of N-3,4-methylenedioxybenzal-aniline.

References Cited by the Examiner

UNITED STATES PATENTS

| 2,426,766 | 9/1947 | Downing et al. | 260—45.9 |
| 2,951,832 | 9/1960 | Moran | 260—45.9 |
| 3,113,880 | 12/1963 | Hoeschele et al. | 260—45.95 |
| 3,115,466 | 12/1963 | Orloff et al. | 260—45.9 |
| 3,216,969 | 11/1965 | Cyba | 260—45.9 |

FOREIGN PATENTS 826,262  12/1959  Great Britain.

LEON J. BERCOVITZ, *Primary Examiner.*

DONALD E. CZAJA, *Examiner.*

H. E. TAYLOR, *Assistant Examiner.*